Nov. 11, 1958 M. B. CARROLL ET AL 2,859,941
COMBINATION ROTARY AND IMPACT DRILL
Filed Feb. 6, 1956 2 Sheets-Sheet 1

Martin B. Carroll
Lester Courville
INVENTORS

BY Ranseler O. Wyatt

ATTORNEY

Nov. 11, 1958  M. B. CARROLL ET AL  2,859,941
COMBINATION ROTARY AND IMPACT DRILL
Filed Feb. 6, 1956  2 Sheets-Sheet 2

Martin B. Carroll
Lester Courville
INVENTORS

BY *Ransales O. Wyatt*

ATTORNEY

United States Patent Office 2,859,941
Patented Nov. 11, 1958

2,859,941

COMBINATION ROTARY AND IMPACT DRILL

Martin B. Carroll, Pasadena, Tex., and Lester Courville, Krotz Springs, La.

Application February 6, 1956, Serial No. 563,572

2 Claims. (Cl. 255—61)

This invention relates to new and useful improvements in a combination rotary and impact drill.

It is an object of this invention to provide a novel drill bit for use in drilling well bores, particularly in hard formation.

It is another object of the invention to provide a drill bit having novel means for effecting a cutting action when used in conjunction with a cone bit.

It is still a further object of this invention to provide a drill bit having novel means for imparting cutting force to a drill bit during its operation.

It is still a further object of the invention to provide a drill bit having means for applying force to a cutting surface actuated by the flow of drilling mud.

With the above and other objects in view, the invention has relation to certain novel features of construction, operation, and arrangement of parts more specifically defined by the following specifications and illustrated in the accompanying drawings, wherein.

Figure 1:
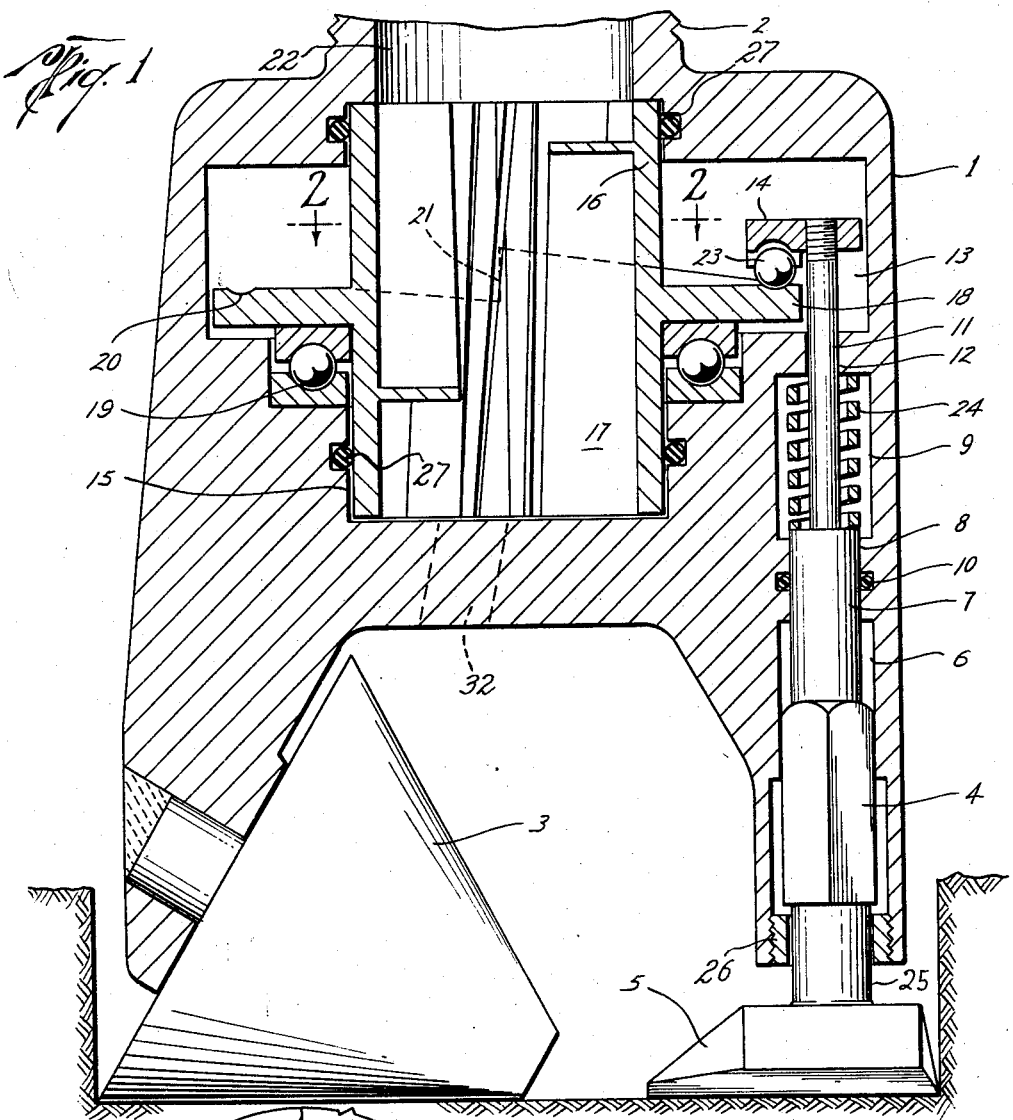
Figure 1 is an elevational view, partly in section.
Figure 2:
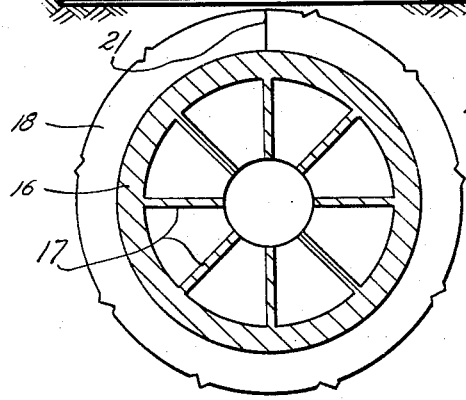
Figure 2 is a top plan view taken on the line 2—2 of Figure 1.
Figure 3:
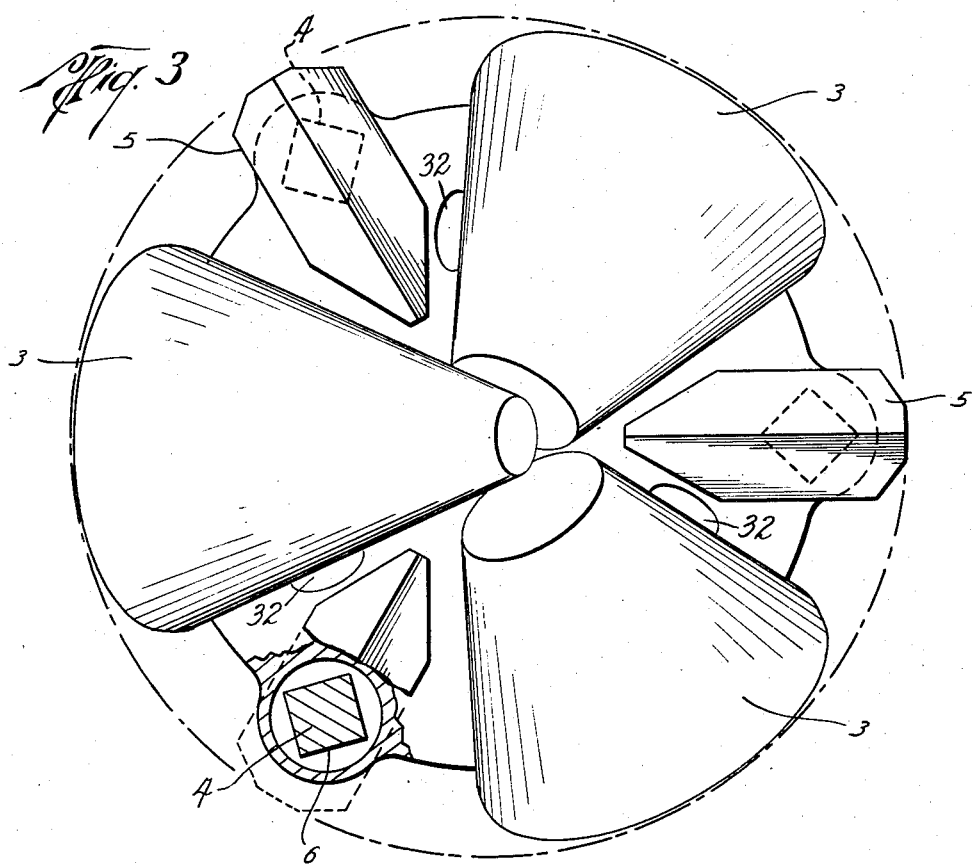
Figure 3 is a bottom view, partly in section.

In the drawings, the numeral 1 designates a housing having a threaded drill stem receiving shank 2 and having a series of cone cutting members 3, 3, rotatably mounted in the housing. Between the respective cones 3, 3 are the anvil rods 4, 4, preferably three in number, which are preferably squared to prevent rotation, and on the lower ends of which are mounted suitable cutting blades 5 of sufficient volume to provide an effective cutting member, and which said blades are preferably beveled to form a sharp cutting edge.

The rods 4 reciprocate in a squared chamber 6 in the housing 1, and a cylindrical extension 7 passes through the opening 8 into the spring chamber 9. Suitable packing means, as the O-rings 10, may be utilized to prevent passage of fluid into the chamber 9.

An actuating shaft 11 is mounted on the rod 7 and extends through the chamber 9 and through a passageway 12 into the chamber 13 and mounted on the upper end of the shaft 11 is the ball cage 14.

The bit housing 1 has the conventional drilling mud passageway 22 extending therethrough, the upper end of which is enlarged forming a vane chamber 15. Mounted in said chamber 15 is a rotating actuator 16 having suitable longitudinal vanes 17. The housing 1 may be divided circumferentially adjacent the chamber 13, and the actuator 16 placed in the chamber after which the two sections of the housing may be welded or otherwise secured together. The actuator 16 has a suitable peripheral extension 18 which extension extends into the chamber 13 and the lower surface thereof is provided with suitable anti-friction bearings, as 19, and the upper surface is inclined forming a jumping cam. An annular groove 20 is cut in the upper surface of the extension 18 adjacent the outer margin thereof. The inclined surface of the extension reaches a peak of inclination and forms the shoulder 21. A ball 23 is mounted in the cage 14 and seats in the groove 20 and a spring 24 of the desired strength is mounted on the shaft 11 in the chamber 9, constantly urging the bit downwardly. Suitable packing means as 27, 27 may be provided between the actuator 16 and the bit housing 1.

As the bit housing 1 is rotated, drilling mud will be forced through the opening 22, turning the actuator 16 by pressure against the vanes 17, and as the actuator 16 rotates, the ball 23 riding in the groove 20 will raise the bit 5 against the pressure of the spring 24 until the ball passes the shoulder 21, where it will drop, permitting the spring 24 to force the bit 5 downwardly under pressure, delivering a blow against the formation. The cage 14 has a ball retaining groove of sufficient depth to protect the ball against damage upon passing the shoulder 21, the blade 5 effecting a stop of the downward movement of the cage 14 upon contact with the formation.

Suitable means may be provided for retaining the anvil 5 in the bit housing 1 such as reducing the diameter of the lower portion of the rod 4, as at 25, and enlarging the diameter of the lower portion of the chamber 6, forming same into a cylinder, and providing a restriction in the bottom of the chamber 6, such as the threaded washer 26, so that breakage of any of the reduced parts of the anvil operating mechanism will not permit leaving a part of the tool in the hole, but will retain such broken part in the bit housing 1.

After the tool is lowered into the hole, and drilling operations started, as the bit housing 1 rotates, the anvils 5 will strike against the formation, chipping or loosening the formation, and the cone rollers following will pulverize the formation in the customary manner, and the drilling mud will wash the cuttings away as it circulates through the exhaust passageway 32, against the cones 3 and upwardly through the bore. After each anvil strikes its blow, it will be immediately raised off of the formation by the inclined surface on the extension 18 and the ball 23. The speed of rotation of the actuator 16 will be governed by the viscosity and pressure of the drilling mud, the preferable viscosity and pressure being such that will cause a more rapid rotation on the actuator 16 than that of the housing 1.

Figure 4:
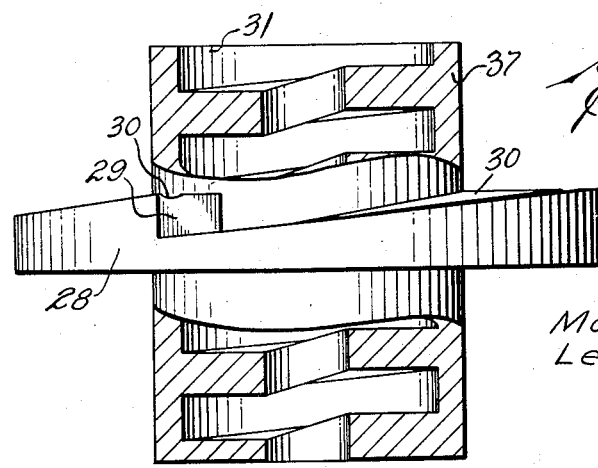
Figure 4 is a fragmentary elevational view of a modified form of the invention.

In the view shown in Figure 4, a threaded vane 31 is employed within the actuator 37, having a pitch sufficient to cause rotation of the vane upon flow of drilling fluid through the actuator and the actuator extension 28 is formed to provide three inclined surfaces, as 30, so that in the event it is desired to actuate the blades 5 simultaneously, the balls 23 will all pass the respective shoulders at the same time. Any other arrangement of the time of effecting a blow by the respective blades may be accomplished by the location of the shoulders 29.

While the foregoing is considered a preferred form of the invention, it is by way of illustration only, the broad principle of the invention being defined by the appended claims.

What we claim is:

1. In a bit, a bit housing, rotating drilling cones mounted in said housing and a drilling mud passageway through said housing, reciprocal cutting blades mounted in said housing between said cones, actuating means actuated by drilling mud passing through said drilling mud passageway for reciprocating said cutting blades, said actuating means having a series of vanes vertically mounted therein and positioned to cause a rotating movement of said actuating means as fluid pressure bears against said vanes, and a lateral extension on said actuating means having a grooved and inclined upper surface, said inclined surface terminating in a shoulder, a ball riding in said groove and caged in a retaining means mounted on the upper end of said cutting blades.

2. In a combination rotary and impact bit, a housing having one end reduced and externally threaded to receive a drill stem connection, a port leading into said housing from said reduced end through which drilling mud may be directed, an actuator chamber in said housing and a bit actuating means mounted in said chamber, means sealing said actuating means in said chamber and means for rotating said actuating means relative to said bit, said actuating means having a peripheral flange and a track formed in the upper surface of said flange, a series of drops in the upper surface of said flange in the path of said track, a series of cones on the bottom of said bit and a series of reciprocal bits, one of which is mounted between each pair of said cones, a series of bit chambers in which said bits are mounted, said bit chambers having an enlarged chamber in which a spring is mounted which constantly urges said bit downwardly and an enlarged chamber through which said bit extends, the last mentioned chamber being longitudinally squared and the portion of said bit extending therethrough having enlarged and squared longitudinal side walls fitting closely in said chamber, the upper end of said bit extending into said actuating means chamber and having a cage mounted thereon having a ball in said cage seated on the track of said actuating means.

References Cited in the file of this patent

UNITED STATES PATENTS

| | | |
|---|---|---|
| 879,971 | Locke | Feb. 28, 1908 |
| 1,748,341 | Grant et al. | Feb. 25, 1938 |
| 2,198,849 | Waxler | Apr. 30, 1940 |
| 2,241,712 | McNamara | May 13, 1941 |
| 2,350,364 | Menhall | June 6, 1944 |
| 2,400,853 | Stilley | May 21, 1946 |
| 2,710,740 | Dempsey | June 14, 1955 |